United States Patent
Kudou (10) Patent No.: US 12,194,947 B2
(45) Date of Patent: Jan. 14, 2025

(54) VEHICLE OCCUPANT RESTRAINT DEVICE

(71) Applicant: TOYOTA JIDOSHA KABUSHIKI KAISHA, Toyota (JP)

(72) Inventor: Toshiya Kudou, Anjyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/420,757

(22) Filed: Jan. 24, 2024

(65) Prior Publication Data
US 2024/0308459 A1    Sep. 19, 2024

(30) Foreign Application Priority Data

Mar. 16, 2023 (JP) .................. 2023-042262

(51) Int. Cl.
*B60R 21/231* (2011.01)
*B60R 21/207* (2006.01)
*B60R 21/2338* (2011.01)

(52) U.S. Cl.
CPC ...... *B60R 21/23138* (2013.01); *B60R 21/207* (2013.01); *B60R 21/2338* (2013.01); *B60R 2021/23146* (2013.01); *B60R 2021/23386* (2013.01)

(58) Field of Classification Search
CPC ............ B60R 21/207; B60R 21/23138; B60R 21/2338; B60R 2021/23146; B60R 2021/23161; B60R 2021/23386; B60R 2021/23388
See application file for complete search history.

(56) References Cited

U.S. PATENT DOCUMENTS

| 6,029,993 | A | * | 2/2000 | Mueller | ............... B60R 21/2338 280/730.2 |
| 8,684,408 | B2 | * | 4/2014 | Thomas | ............... B60R 21/2338 280/730.2 |
| 9,016,718 | B2 | * | 4/2015 | Fukawatase | ......... B60R 21/233 280/730.2 |
| 9,132,798 | B2 | * | 9/2015 | Yasuoka | ............... B60R 21/231 |

(Continued)

FOREIGN PATENT DOCUMENTS

| JP | 2009-029182 A | | 2/2009 |
| JP | 2009166680 A | * | 7/2009 |

(Continued)

*Primary Examiner* — Laura Freedman
(74) *Attorney, Agent, or Firm* — SOLARIS Intellectual Property Group, PLLC (57) ABSTRACT

A vehicle occupant restraint device includes: a center airbag that is provided at a side portion at a vehicle width direction inner side of a seatback of the vehicle seat, and that inflates and deploys toward a vehicle width direction inner side of an occupant seated at the vehicle seat due to gas ejected from an inflator being supplied to an interior of the center airbag; and a string-like member, one end portion of the string-like member being attached to a seat front side end portion of the center airbag and another end portion of the string-like member being attached to a retracting device, and the string-like member being pulled toward a seat front side due to the string-like member being retracted by the retracting device at a timing at which the occupant is restrained by the center airbag that has been inflated and deployed.

7 Claims, 6 Drawing Sheets

(56) References Cited

U.S. PATENT DOCUMENTS

| | | | |
|---|---|---|---|
| 10,023,147 B2 * | 7/2018 | Kwon | B60R 21/23138 |
| 10,500,988 B1 * | 12/2019 | Faruque | B60N 2/933 |
| 10,543,800 B2 * | 1/2020 | Kwon | B60R 21/233 |
| 10,596,993 B2 * | 3/2020 | Dry | B60R 21/232 |
| 11,021,129 B2 * | 6/2021 | Saito | B60R 21/23138 |
| 11,208,070 B1 * | 12/2021 | Jaradi | B60R 21/207 |
| 11,247,633 B1 * | 2/2022 | Schneider | B60R 21/207 |
| 11,273,783 B1 * | 3/2022 | Faruque | B60R 21/2338 |
| 11,390,238 B2 * | 7/2022 | Shin | B60R 21/23138 |
| 11,541,840 B2 * | 1/2023 | Jaradi | B60R 21/264 |
| 11,618,404 B1 * | 4/2023 | Jaradi | B60R 21/23138 280/730.1 |
| 11,904,792 B2 * | 2/2024 | Schneider | B60R 21/23138 |
| 11,912,230 B2 * | 2/2024 | Faruque | B60R 21/207 |
| 11,938,887 B2 * | 3/2024 | Saito | B60R 21/207 |
| 2006/0049682 A1 * | 3/2006 | Yamanaka | B60N 2/0715 297/452.18 |
| 2012/0091697 A1 | 4/2012 | Wiik et al. | |
| 2019/0248322 A1 * | 8/2019 | Herzenstiel | B60R 21/207 |

FOREIGN PATENT DOCUMENTS

| | | | |
|---|---|---|---|
| JP | 2012-081958 A | | 4/2012 |
| JP | 2014012495 A | * | 1/2014 |
| JP | 2014121924 A | * | 7/2014 |
| JP | 2020-131792 A | | 8/2020 |
| WO | 2021/176895 A1 | | 9/2021 |
| WO | WO-2021220885 A1 * | 11/2021 | B60R 21/18 |

* cited by examiner

VEHICLE OCCUPANT RESTRAINT DEVICE

CROSS-REFERENCE TO RELATED APPLICATION

This application is based on and claims priority under 35 USC 119 from Japanese Patent Application No. 2023-042262, filed on Mar. 16, 2023, the disclosure of which is incorporated by reference herein.

BACKGROUND

Technical Field

The present disclosure relates to a vehicle occupant restraint device.

Related Art

Occupant restraint systems in which a lower end portion of a far side airbag is deployed between a waist portion of an occupant and a console box, and movement of the occupant toward the vehicle width direction inner side is suppressed, are conventionally known (see, for example, Japanese Patent Application Laid-Open (JP-A) No. 2012-081958).

Further, occupant protection devices that include a tether, the tether connecting a seat and an upper portion of a center airbag, which has been inflated and deployed from a seatback of the seat, and pulling the center airbag after inflation and deployment toward a seat side, and that control tension of the tether according to a front-rear positional relationship between seatbacks of the left and right seats are also conventionally known (see, for example, Japanese Patent Application Laid-Open (JP-A) No. 2020-131792).

However, in cases in which the lower end portion of the center airbag that has been inflated and deployed does not sufficiently overlap with the console box in side-on view, in other words, in cases such as ones of a small occupant, there are cases in which the vehicle seat adopts a front side position in which the front end face at a side portion of the seatback is positioned further toward the front side than the front face of the console box.

In such cases, at a time at which the occupant is restrained by the center airbag that has been inflated and deployed, it is difficult for the center airbag to obtain reaction force from the console box.

Therefore, there is a possibility that an occupant that moves toward the vehicle width direction inner side under inertia force due to a side-on collision of the vehicle collapses toward the vehicle width direction inner side together with the center airbag. Namely, in plan view, the center airbag that has been inflated and deployed might rotate toward the vehicle width direction inner side about a rear end portion of the center airbag as a rotation center, and it might be difficult to restrain the occupant with the center airbag that has been inflated and deployed.

Further, simply pulling the upper portion of the center airbag that has been inflated and deployed from the seatback of the seat toward the seat side by the tether may not effectively obtain reaction force at a lower portion side of the center airbag at a time at which the occupant is restrained by the inflated and deployed center airbag. Therefore, there is still room for improvement in structures that effectively apply reaction force to a center airbag at a time at which an occupant is restrained by the center airbag that has been inflated and deployed.

SUMMARY

An object of the present disclosure is to obtain a vehicle occupant restraint device that is capable of effectively applying reaction force to a center airbag at a time at which an occupant is restrained by a center airbag that has been inflated and deployed from a side portion at a vehicle width direction inner side of a seatback toward a vehicle width direction inner side of the occupant.

Means for Solving the Problem

In order to achieve the above-described object, a vehicle occupant restraint device of a first aspect according to the present disclosure includes: a vehicle seat that is provided at a vehicle interior so as to be movable in a vehicle front-rear direction by an upper rail that is supported by a lower rail; a center airbag that is provided at a side portion at a vehicle width direction inner side of a seatback of the vehicle seat, and that inflates and deploys toward a vehicle width direction inner side of an occupant seated at the vehicle seat due to gas ejected from an inflator being supplied to an interior of the center airbag; and a string-like member, one end portion of the string-like member being attached to a seat front side end portion of the center airbag and another end portion of the string-like member being attached to a retracting device, and the string-like member being pulled toward a seat front side due to the string-like member being retracted by the retracting device at a timing at which the occupant is restrained by the center airbag that has been inflated and deployed.

According to the vehicle occupant restraint device of the first aspect, the inflator is actuated at a time of a vehicle side-on collision, and gas ejected from the inflator is supplied to the interior of the center airbag. Therefore, the center airbag is inflated and deployed toward the vehicle width direction inner side of the occupant that is seated at the vehicle seat. It should be noted that "at a time of a vehicle side-on collision" includes not only when a vehicle side-on collision has been detected, but also when a vehicle side-on collision has been predicted.

In cases in which an occupant that is seated at a vehicle seat is a small occupant, for example, there are cases in which the vehicle seat adopts a front side position in side view in which a front end face at a side portion of the seatback is positioned further toward the vehicle front side than a front face of the console box. In such cases, it is difficult for the center airbag that has been inflated and deployed to obtain reaction force from the console box.

However, the one end portion of the string-like member is attached to the seat front side end portion of the center airbag, and the other end portion of the string-like member is attached to the retracting device. Further, the retracting device retracts the string-like member at a timing at which the occupant is restrained by the center airbag that has been inflated and deployed, and pulls the string-like member toward the seat front side. Namely, the center airbag that has been inflated and deployed is pulled toward the seat front side by the string-like member at an appropriate timing at which the occupant is restrained.

Therefore, in side view, even in a case in which a lower end portion of the center airbag does not sufficiently overlap with the console box, at a time at which the occupant is restrained by the center airbag that has been inflated and deployed, rotation behavior (collapse) toward the vehicle width direction inner side about a rear end portion of the center airbag as a rotation center is suppressed, and reaction force (holding force) is effectively applied to the center airbag. Therefore, the occupant is effectively restrained by the center airbag.

A vehicle occupant restraint device according to a second aspect of the present disclosure is the vehicle occupant restraint device according to the first aspect, further including: a tether that is provided further toward a seat upper side than a seat up-down direction central portion at the interior of the center airbag, and that maintains a shape of the center airbag that has been inflated and deployed; and a tension transmission base cloth that is provided at a seat up-down direction central portion at the seat front side end portion of the center airbag, and to which the one end portion of the string-like member is attached, wherein, in side view, an upper end of the tension transmission base cloth is disposed at a same height position as the tether of the center airbag that has been inflated and deployed, and a lower end of the tension transmission base cloth is disposed at a same height position as an attachment position of the center airbag at the seatback.

According to the vehicle occupant restraint device of the second aspect, in side view, the upper end of the tension transmission base cloth is disposed at the same height position as the tether of the center airbag that has been inflated and deployed, and the lower end of the tension transmission base cloth is disposed at the same height position as the attachment position of the center airbag at the seatback. It should be noted that the portion at which the tether is provided and the attachment position of the center airbag are portions with high rigidity. Therefore, when the tension transmission base cloth is provided between the two, the center airbag that has been inflated and deployed is pulled toward the seat front side with good up-down balance. Namely, reaction force is more effectively applied (with good up-down balance) to the center airbag. It should be noted that "the same height position" herein includes "approximately the same height position" that is slightly offset in the up-down direction from the same height position.

A vehicle occupant restraint device according to a third aspect of the present disclosure is the vehicle occupant restraint device according to the first aspect or the second aspect, wherein: the retracting device is provided at a seat front side portion of a seat cushion of the vehicle seat; and an intermediate portion of the string-like member is housed in a case that is provided at a seat width direction outer side of the upper rail of the vehicle seat, and the intermediate portion protrudes out from the case at a time at which the intermediate portion is retracted in by the retracting device.

According to the vehicle occupant restraint device of the third aspect, the retracting device is provided at the seat front side portion of the seat cushion of the vehicle seat. Due thereto, the string-like member is efficiently pulled toward the seat front side. Therefore, reaction force is more effectively applied to the center airbag that has been inflated and deployed, and restraining force with respect to the occupant is improved. Further, in a case in which the retracting device is provided at the seat front side portion of the seat cushion of the vehicle seat, it is not necessary to arrange the string-like member, which is pulled toward the seat front side, from the seat front side portion to the seat rear side portion of the seat cushion or provide a pulley or the like at the seat front side portion of the seat cushion, compared to cases in which the retracting device is provided at the seat rear side portion of the seat cushion, for example. Therefore, the length of the string-like member is reduced, and a pulley or the like need not be provided, thereby simplifying the configuration of the seat cushion.

Further, a configuration is such that the intermediate portion of the string-like member is housed in the case that is provided at the seat width direction outer side of the upper rail of the vehicle seat, and the intermediate portion protrudes out from the case at a time at which the intermediate portion is retracted by the retracting device. Namely, in normal cases, the intermediate portion of the string-like member is hidden by the case. This enables the appearance of the vehicle seat to be inhibited from being spoiled by the intermediate portion of the string-like member in a normal state.

A vehicle occupant restraint device according to a fourth aspect of the present disclosure is the vehicle occupant restraint device according to the third aspect, wherein the retracting device includes: a spool around which another end portion of the string-like member is wound; and a rack and pinion mechanism that is driven by a gas generator and that causes the spool to rotate.

According to the vehicle occupant restraint device of the fourth aspect, the retracting device includes the spool around which the other end portion of the string-like member is wound, and the rack and pinion mechanism that is driven by the gas generator and causes the spool to rotate. Therefore, the center airbag that has been inflated and deployed is effectively pulled toward the seat front side by the string-like member at an appropriate timing to restrain the occupant. Namely, reaction force is more effectively applied to the center airbag.

A vehicle occupant restraint device according to a fifth aspect of the present disclosure is the vehicle occupant restraint device according to the third aspect, wherein: the string-like member is an inflatable tension strap that generates tension due to inflation of a chamber; and the retracting device includes an inflator that supplies gas to the chamber.

According to the vehicle occupant restraint device of the fifth aspect, the string-like member is an inflatable tension strap that generates tension due to inflation of the chamber. Further, the retracting device includes an inflator that supplies gas to the chamber. Therefore, the center airbag that has been inflated and deployed is effectively pulled toward the seat front side by the inflatable tension strap at an appropriate timing to restrain the occupant. Namely, reaction force is more effectively applied to the center airbag. Further, the thighs of the occupant are restrained by the inflatable tension strap, thereby improving restraint performance with respect to the occupant.

As described above, the present disclosure enables reaction force to be effectively applied to a center airbag at a time at which the occupant is restrained by the center airbag that has been inflated and deployed from a side portion at the vehicle width direction inner side of the seatback toward the vehicle width direction inside.

BRIEF DESCRIPTION OF THE DRAWINGS

Exemplary embodiments of the present disclosure will be described in detail based on the following figures, wherein.

DETAILED DESCRIPTION

Detailed explanation follows regarding exemplary embodiments of the present disclosure, based on the drawings. It should be noted that for convenience of explanation, in the respective drawings, as appropriate, the arrow UP indicates an upward direction of a vehicle and a vehicle seat, the arrow FR indicates a frontward direction of the vehicle and the vehicle seat, and the arrow RH indicates a rightward direction of the vehicle and the vehicle seat. Therefore, in the following explanation, in cases in which up-down, front-rear, and left-right directions are described without any particular notation to the contrary, these indicate up and down, front and rear, and left and right with respect to the vehicle and the vehicle seat. Further, the left-right direction is the same as a vehicle width direction and a seat width direction.

Further, although not illustrated in the drawings, as an example, an occupant in the present exemplary embodiment is an occupant corresponding to an AF05 (5th percentile American adult females) World Side Impact Dummy (World SID). Namely, the occupant in the present exemplary embodiment is, as an example, a small occupant.

First Exemplary Embodiment

Figure 1:
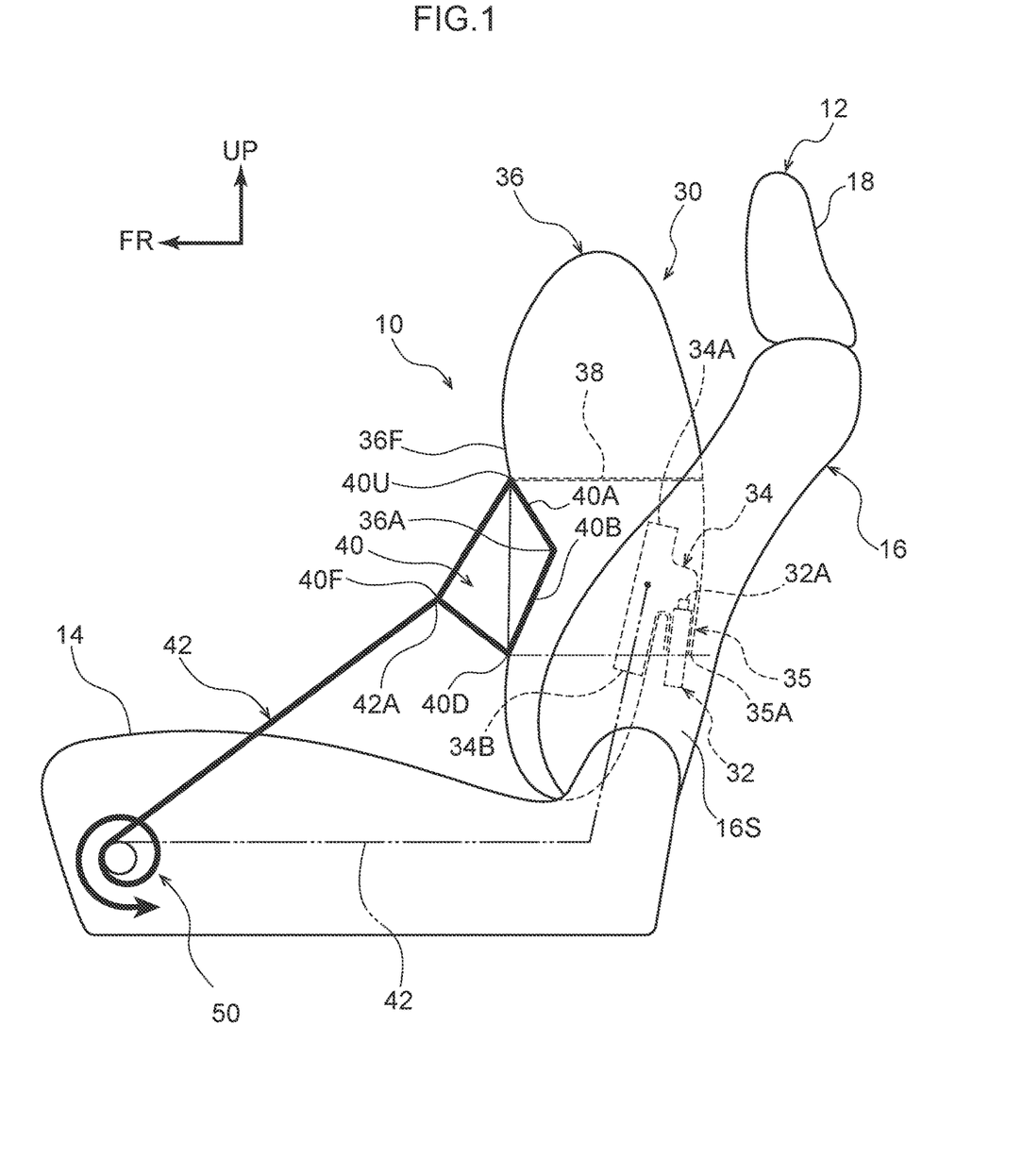
FIG. 1 is a schematic side view illustrating a vehicle seat at a time at which a center airbag of a vehicle occupant restraint device according to a first exemplary embodiment has been inflated and deployed.

First, a first exemplary embodiment will be explained. As illustrated in FIG. 1, as an example, a vehicle seat 12 configuring a vehicle occupant restraint device 10 according to the first exemplary embodiment is a front right-hand side seat that is provided at a vehicle interior of a vehicle, and the vehicle seat 12 includes a seat cushion 14 at which an occupant is seated (the seat cushion 14 supporting the buttocks and thighs of the occupant), a seatback 16 that supports a back of the occupant, and a headrest 18 that supports a head of the occupant.

In a side view viewed from a vehicle width direction (seat width direction), the seat cushion 14 extends in the front-rear direction, and the seatback 16 is coupled to a rear end portion of the seat cushion 14 so as to be rotatable with the seat width direction as an axial direction, and extends in the up-down direction. Further, the headrest 18 is provided so as to be capable of moving up and down at a seat width direction central portion of an upper end portion of the seatback 16.

It should be noted that the occupant is restrained at the vehicle seat 12 by a seatbelt device (not illustrated in the drawings). Further, a buckle device, to which a tongue that is provided at a seatbelt of the seatbelt device is detachably attached, is attached to a seat-side garnish (not illustrated in the drawings) that covers a seat width direction outer side of a lower portion side of the seat cushion 14.

Figure 2:
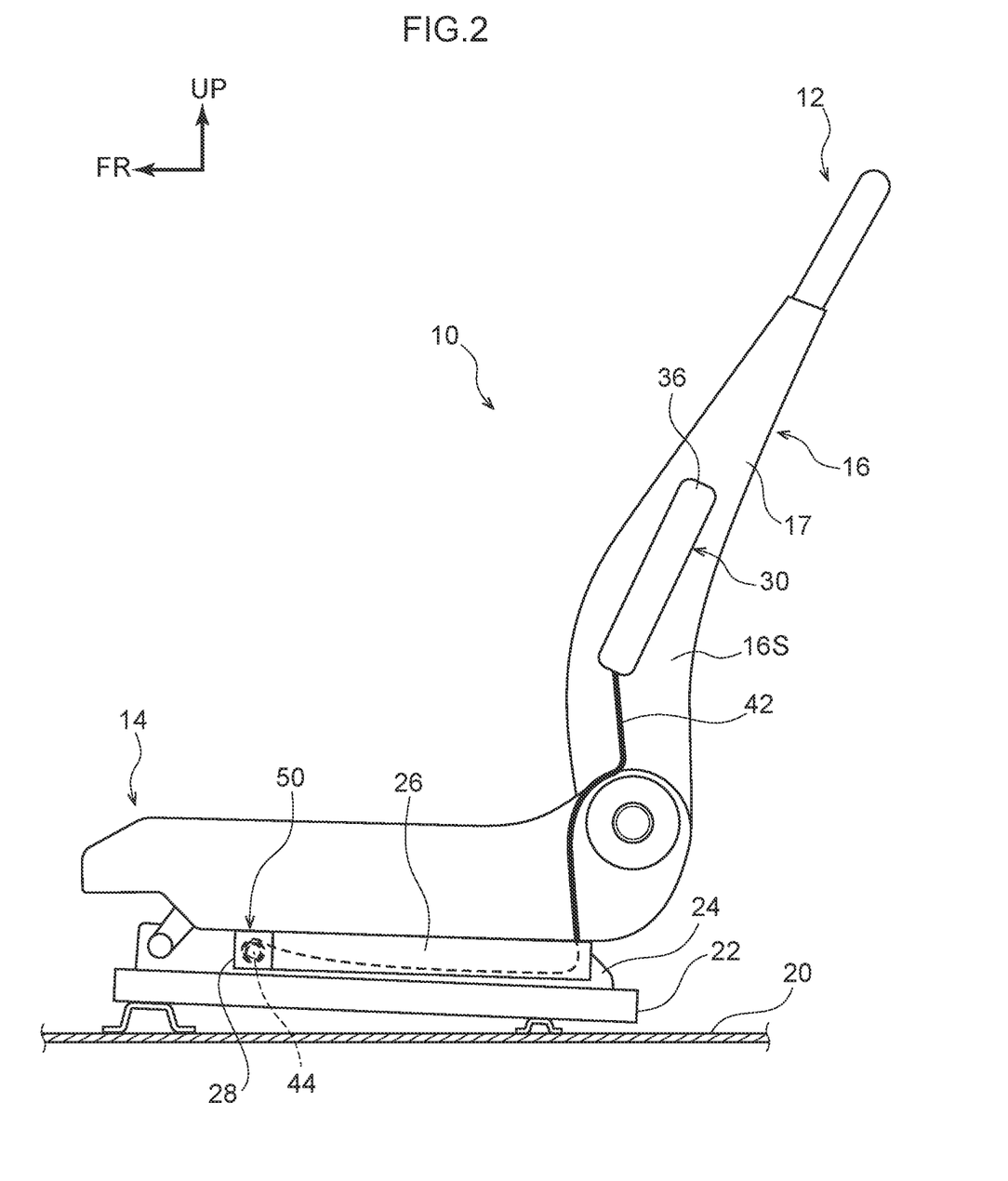
FIG. 2 is a schematic side view illustrating a state of the arrangement of a strap of the vehicle occupant restraint device according to the first exemplary embodiment.

As illustrated in FIG. 2, a left and right pair of lower rails 22 that respectively extend in the front-rear direction are provided at a floor 20 of the vehicle interior. Each lower rail 22 supports a respective one of a left and right pair of upper rails 24 so as to enable sliding in the front-rear direction, the respective left and right pair of upper rails 24 being provided at a lower portion at each seat width direction side of the seat cushion 14. The upper rail 24 (the seat cushion 14) is configured so as to be capable of moving along the lower rail 22 in the front-rear direction by a known electric mechanism.

Further, although not illustrated in the drawings, a console box is provided further to a vehicle width direction inner side (a vehicle width direction central portion) than the vehicle seat 12 at the floor 20 of the vehicle interior. The console box is a rectangular hollow box with a length direction of the console box being in the front-rear direction in plan view, and an upper portion of the console box is open and is configured to be opened and closed by a lid portion having a predetermined thickness. It should be noted that the height to the upper face of the lid portion of the console box is such that the occupant can place an elbow portion thereon without having to adopt an uncomfortable posture.

Further, as illustrated in FIG. 1, a center airbag device 30 is provided at a left side portion 16S, which is a side portion at a vehicle width direction inner side of the seatback 16. The center airbag device 30 includes an inflator 32 that is embedded at the left side portion 16S of the seatback 16, an inner cloth (inner tube) 34 that distributes gas ejected from the inflator 32 toward an upper side and a lower side, and a center airbag 36 (far side airbag) at an interior of which the inner cloth 34 is provided.

The inflator 32 is a cylinder-type gas generating device that is formed in a substantially cylindrical shape, and an axial direction of the inflator 32 is a direction (substantially the up-down direction) along a side frame 17 (see FIG. 2) that configures a frame at both the left and right side portions of the seatback 16. Further, the inflator 32 is attached to the side frame 17, along with the center airbag 36 that has been folded.

It should be noted that FIG. 2 illustrates a center airbag device 30 that is modularized by the center airbag 36 (including the inner cloth 34) that has been folded and the inflator 32. The inflator 32 is actuated at a time at which a vehicle side-on collision has been detected or predicted (hereinafter referred to as "at a time of a vehicle side-on collision"), and is capable of instantaneously supplying gas to the interior of the center airbag 36 via the inner cloth 34.

As illustrated in FIG. 1, a tube portion 35 that extends toward a lower side is integrally formed at a rear side of the inner cloth 34, and an upper end portion 32A that includes an ejection port of the inflator 32 is inserted into the tube portion 35 from a lower side, and is connected to the tube portion 35. It should be noted that a height position of a lower end peripheral edge portion 35A of the tube portion 35 at the inner cloth 34 is an attachment position of the center airbag 36 at the seatback 16 (the side frame 17).

A front side of the inner cloth 34 is formed in a tube shape that has a substantially up-down direction as an axis direction, and includes an upper opening 34A and a lower opening 34B. Therefore, the inner cloth 34 is capable of ejecting gas ejected from the inflator 32 toward the upper side and the lower side at the interior of the center airbag 36. As a result, the center airbag 36 is configured to be quickly inflated and deployed.

Namely, due to the interior of the center airbag 36 that is folded and embedded at the left side portion 16S of the seatback 16 being supplied with gas ejected from the inflator 32, the center airbag 36 is quickly disposed, in side view, from a substantially central portion in the up-down direction of the headrest 18 to the vicinity of a lower end portion of the seatback 16 (to a predetermined position further to a lower side than the upper surface of the lid portion of the console box in front view).

More specifically, the center airbag 36 that has been inflated and deployed is disposed at a vehicle width direction inner side of at least a waist region, an abdomen region, a chest region, a shoulder region, and the head of the occupant that is seated at the vehicle seat 12. In particular, an upper portion of the center airbag 36 is formed in a substantially elliptical shape that bulges further toward the front and upper sides than a lower portion that restrains downward from the chest region of the occupant, so as to be capable of restraining the head of the occupant.

In other words, in a state in which inflation and deployment has been completed, the center airbag 36 is formed with a constricted portion 36A that is recessed toward a rear side in a substantially ">" shape at a substantially central portion in the up-down direction at a front side end portion of the center airbag 36 (hereafter referred to as a "front end portion 36F") in side view. It should be noted that the center airbag 36 is formed in a single bag shape by sewing together outer peripheral edge portions of two base cloths.

Further, a tether 38 for maintaining the shape of the center airbag 36 that has been inflated and deployed is provided at a position further upward than a central portion in the up-down direction (at a position substantially the same height as an upper end of a tension transmission base cloth 40, which is described below), at the interior of the center airbag 36. The tether 38 is formed in a plane shape from the same cloth as the base cloth of the center airbag 36, for example, and connects the base cloth at a seat width direction inner side of the center airbag 36 and the base cloth at a seat width direction outer side of the center airbag 36.

Namely, a seat width direction inner side end portion of the tether 38 is sewn to the base cloth at the seat width direction inner side of the center airbag 36, and a seat width direction outer side end portion of the tether 38 is sewn to the base cloth at the seat width direction outer side of the center airbag 36. It should be noted that plural through holes (not illustrated in the drawings) for allowing gas to pass through are formed at appropriate positions at the tether 38. Further, the tether 38 may be configured of, for example, plural belt-shaped straps (not illustrated in the drawings) provided with spacings in the front-rear direction.

The tension transmission base cloth 40 is provided at an up-down direction central portion of the front end portion 36F of the center airbag 36, namely, at the constricted portion 36A. The tension transmission base cloth 40 is formed in a substantially rhombic shape in side view with the same cloth as the base cloth of the center airbag 36, for example, and an upper peripheral edge portion 40A and a lower peripheral edge portion 40B at a rear side of the tension transmission base cloth 40 are disposed along the constricted portion 36A of the center airbag 36, and are sewn to the constricted portion 36A (the front end portion 36F).

It should be noted that, as illustrated in FIG. 1, in a side view, the upper end (an upper side corner portion 40U) of the tension transmission base cloth 40 is disposed at substantially the same height position (at the same height position or a position slightly above) as the tether 38 of the center airbag 36 that has been inflated and deployed. A lower end (a lower side corner portion 40D) of the tension transmission base cloth 40 is disposed at substantially the same height position (at the same height position or a position slightly below) as the lower end peripheral edge portion 35A of the tube portion 35 of the inner cloth 34, serving as an attachment position of the center airbag 36 at the seatback 16 (the side frame 17).

Further, one end portion 42A of a strap 42, which serves as a string-like member, is attached to a corner portion 40F at a front side of the tension transmission base cloth 40. In other words, the one end portion 42A of the strap 42 is attached to the front end portion 36F (constricted portion 36A) of the center airbag 36 via the tension transmission base cloth 40. Another end portion of the strap 42 is attached to a retracting device 50.

Figure 3:
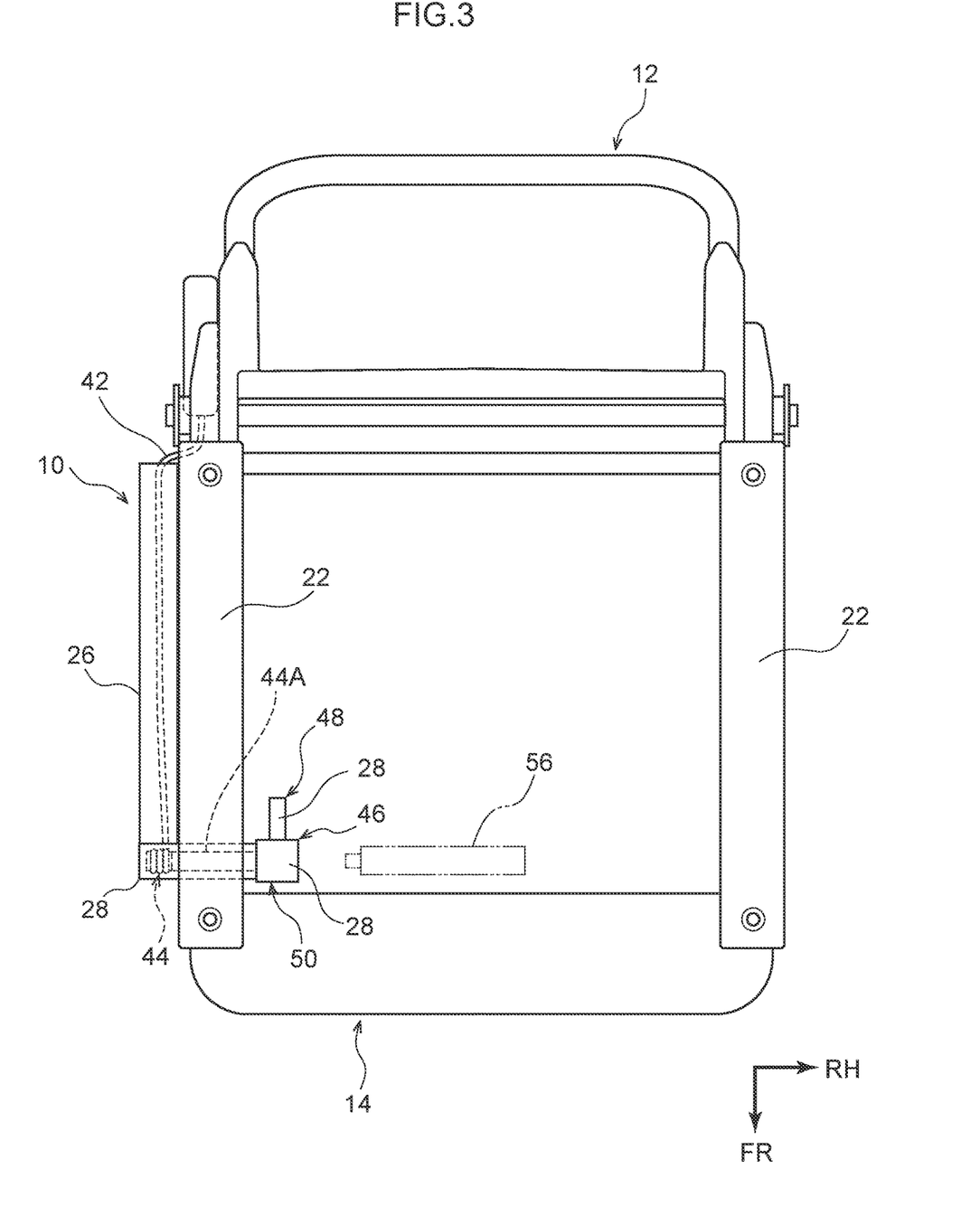
FIG. 3 is a schematic bottom view illustrating a seat cushion of the vehicle seat of the vehicle occupant restraint device according to the first exemplary embodiment.

As illustrated in FIG. 1 to FIG. 3, the retracting device 50 is provided at a front portion (a front side portion) of the vehicle seat 12 at a lower face side of the seat cushion 14. The retracting device 50 includes a spool 44 to which the other end portion of the strap 42 is attached and wound around, a rack and pinion mechanism 46 (see FIG. 4A and FIG. 4B) for rotating the spool 44, and a gas generator 48 for driving the rack and pinion mechanism 46.

Figure 4A:
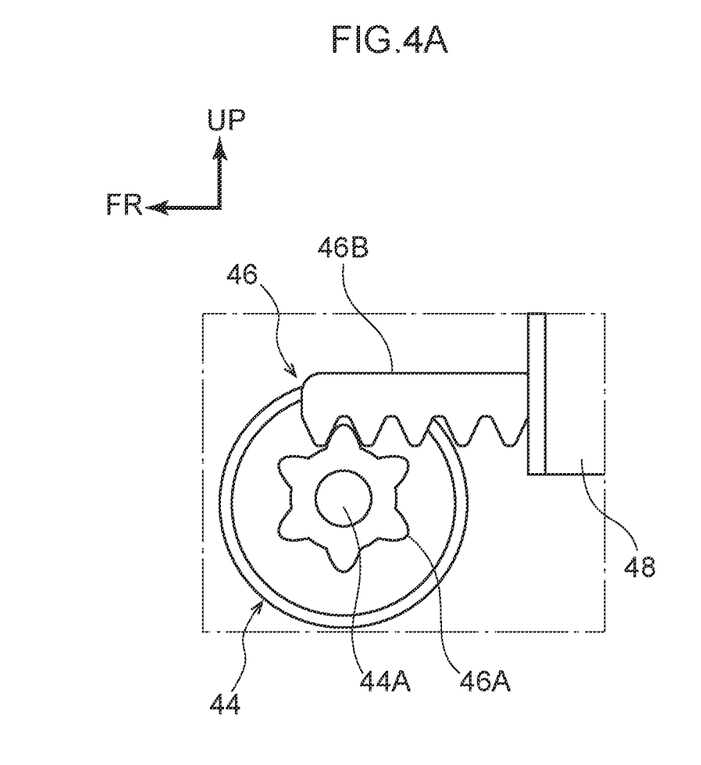
FIG. 4A is a schematic enlarged side view illustrating a state prior to actuation of a retracting device of the vehicle occupant restraint device according to the first exemplary embodiment.

The spool 44 is configured so as to be rotatable with the seat width direction as an axial direction, and a rotation shaft 44A of the spool 44 extends toward the seat width direction inner side. Further, as illustrated in FIG. 4A, a pinion gear 46A is coaxially fixed to a vehicle width direction inner side end portion in which the rotation shaft 44A of the spool 44 extends. A rack gear 46B is meshed with the pinion gear 46A from above, and the rack gear 46B is held so as to be capable of protruding out from the gas generator 48.

Figure 4B:
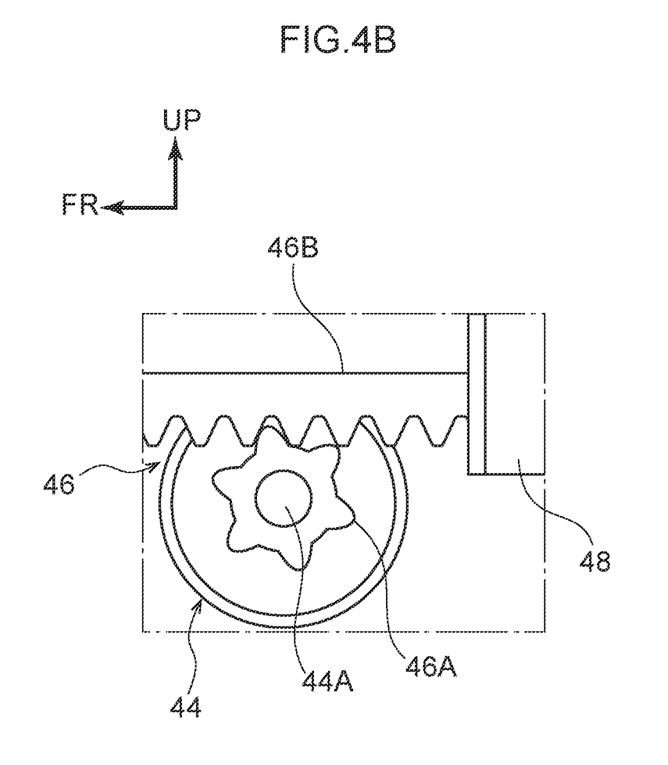
FIG. 4B is a schematic enlarged side view illustrating a state after actuation of the retracting device of the vehicle occupant restraint device according to the first exemplary embodiment.

Therefore, the retracting device 50 is actuated as follows. Namely, the gas generator 48 is actuated at a timing at which the occupant is restrained by the center airbag 36 that has been inflated and deployed. As illustrated in FIG. 4B, the rack gear 46B instantaneously protrudes out toward the front side, and rotates (illustrated as counterclockwise in the drawings) the pinion gear 46A that is meshed with the rack gear 46B. As a result, the spool 44 rotates, and the other end portion side of the strap 42 is instantaneously taken up on the spool 44.

Namely, the other end portion side of the strap 42 is instantaneously retracted by the retracting device 50, and the strap 42 is pulled toward the front side (specifically, the front lower side). Further, at a time at which the strap 42 is pulled toward the front side, the tension transmission base cloth 40 is pulled toward the front side, such that the center airbag 36 is pulled toward the front side (see FIG. 1).

Note that the "timing at which the occupant is restrained by the center airbag 36 that has been inflated and deployed" herein refers to, for example, a timing immediately prior to completion of inflation and deployment of the center airbag 36 (within several tens of milliseconds). Further, each of the spool 44 (including the rotation shaft 44A), the rack and pinion mechanism 46, and the gas generator 48 are covered by a cover body 28.

As illustrated in FIG. 2, the one end portion side of the strap 42 in a state prior to being retracted by the retracting device 50 (in a normal state) is arranged at a lower side along the side frame 17 from the corner portion 40F (see FIG. 1) of the tension transmission base cloth 40 that is folded together with the center airbag 36, and is pulled out to an exterior from a lower end portion of the left side portion 16S of the seatback 16. Further, the one end portion side of the strap 42 is arranged at a lower side of the seat cushion 14 beyond the seat-side garnish at further to the rear side than the buckle device.

The strap 42 that is arranged toward the lower side of the seat cushion 14, is arranged toward the front side at the lower side of the seat cushion 14, and is wound around the spool 44, and an intermediate portion of the strap 42 that is arranged toward the front side at the lower side of the seat cushion 14 extends in the front-rear direction and is housed at an interior of a case 26 made of resin (with no front wall or rear wall) that is open at a front side and a rear side.

Figure 5A:
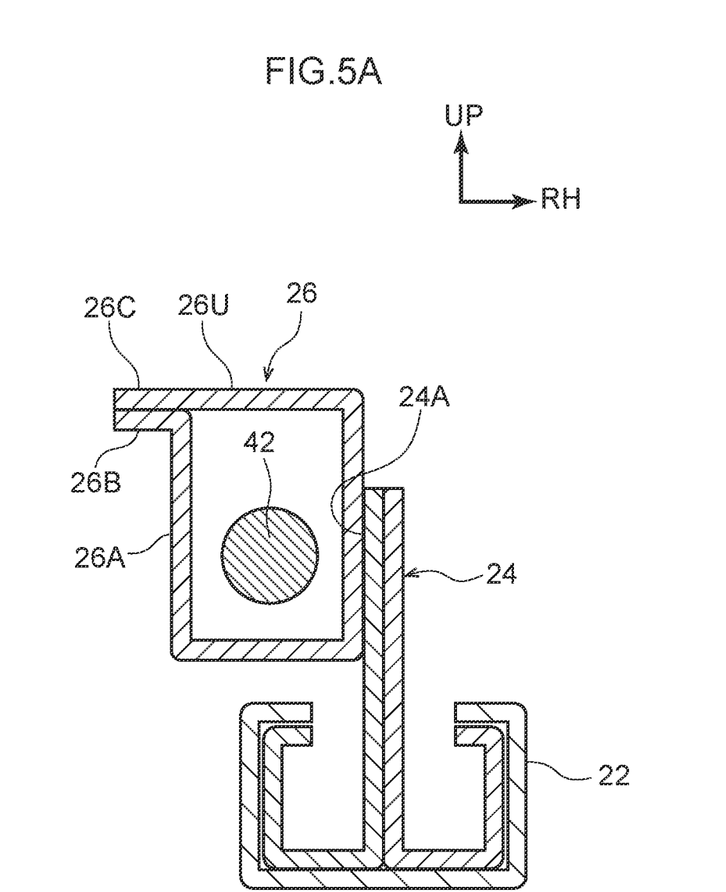
FIG. 5A is a schematic rear view illustrating the strap arranged inside a case of the vehicle occupant restraint device according to the first exemplary embodiment.

As illustrated in FIG. 5A, the case 26 is attached to an outer wall face 24A of the upper rail 24, the outer wall face 24A facing the seat width direction outer side, by an adhesive or the like, and is formed in a tube shape that is substantially rectangular in cross-section as viewed from the front-rear direction. An upper end of an outer wall 26A that is positioned at a seat width direction outer side of the case 26 is a flange portion 26B extending toward the seat width direction outer side, and a seat width direction outer side end portion of an upper wall 26U of the case 26 is a flange portion 26C that is joined to the flange portion 26B by an adhesive or the like that is easily peelable from above the flange portion 26B.

Figure 5B:
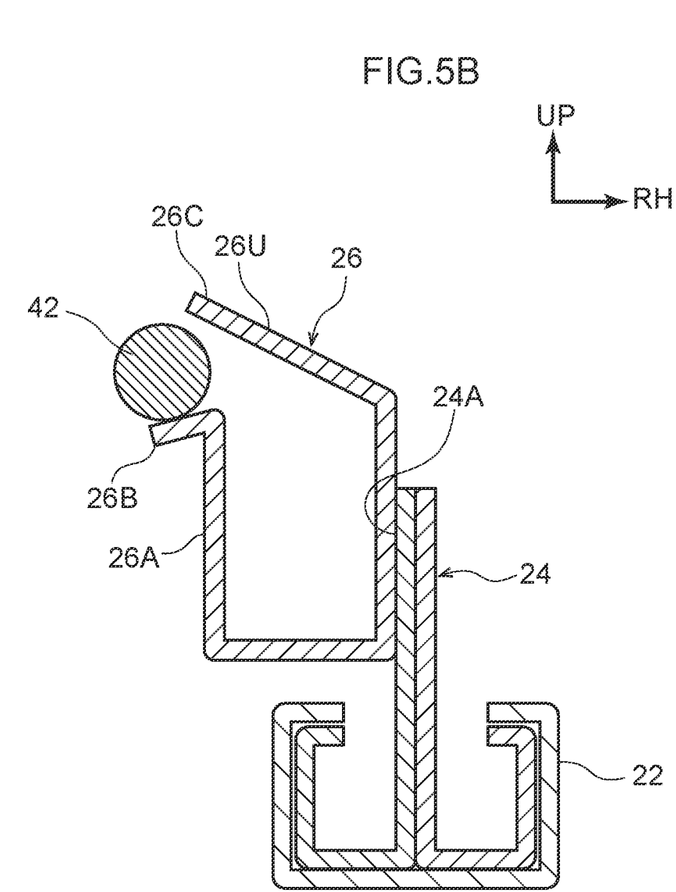
FIG. 5B is a schematic rear view illustrating the strap at a time of protruding out from inside the case of the vehicle occupant restraint device according to the first exemplary embodiment.

Therefore, as illustrated in FIG. 5B, when the strap 42 is retracted by the retracting device 50, the intermediate portion of the strap 42 peels off from the joint between the flange portion 26B and the flange portion 26C, and protrudes out from the case 26. Further, the intermediate portion of the strap 42 which protrudes out from the case 26 moves upward through a seat width direction outer side of the buckle device, and is stretched under a predetermined tension between the spool 44 and the tension transmission base cloth 40 (corner portion 40F) (see FIG. 1).

Next, operation of the vehicle occupant restraint device 10 according to the first exemplary embodiment configured as described above will be explained.

At a time of a vehicle side-on collision, the inflator 32 is actuated, gas ejected from the inflator 32 is instantaneously supplied to the interior of the inner cloth 34, and is supplied to the interior of the center airbag 36 from the upper opening 34A and the lower opening 34B of the inner cloth 34. When this occurs, an epidermis, which extends from the lower end portion to an upper end portion of the left side portion 16S of the seatback 16, is broken due to internal pressure (inflation pressure) of the center airbag 36 that has started to inflate due to the supply of gas.

Namely, the center airbag 36 is inflated and deployed toward the left side surfaces (vehicle width direction inner sides) of at least the waist region, the abdomen region, the chest region, the shoulder region, and the head of the occupant that is seated at the vehicle seat 12. Therefore, at least the left side surfaces from the waist region to the head of the occupant are covered from the left side by the center airbag 36. This enables the left side surfaces from at least the waist region to the head of the occupant, who moves toward the vehicle width direction inner side under inertia force, to be restrained by the center airbag 36 at a time of a vehicle side-on collision.

However, in cases in which the occupant that is seated at the vehicle seat 12 is a small occupant, for example, there are cases in which the vehicle seat 12 adopts a front side position in side view in which a front end face at the lower portion side of the side portion 16S of the seatback is positioned further toward the front side than the front face of the console box. In such cases, it is difficult for the center airbag 36 that has been inflated and deployed to obtain reaction force from the console box.

However, the one end portion 42A of the strap 42 is attached to the front end portion 36F of the center airbag 36 via the tension transmission base cloth 40, and the other end portion of the strap 42 is attached to the retracting device 50. Further, the retracting device 50 retracts the strap 42 and pulls the strap 42 toward the front side at a timing at which the occupant is restrained by the center airbag 36 that has been inflated and deployed. Namely, the center airbag 36 that has been inflated and deployed is pulled toward the front side by the strap 42 (see FIG. 1).

Therefore, in side view, even in a case in which the lower end portion of the center airbag 36, which has been inflated and deployed from the left side portion 16S of the seatback 16 toward the vehicle width direction inner side of the occupant, does not sufficiently overlap with the console box (even if it is shifted toward the front side), rotation behavior (collapse) toward the vehicle width direction inner side (the seat width direction outer side) about a rear end portion of the center airbag 36 as a rotation center can be effectively suppressed or prevented at a time at which the occupant is restrained by the center airbag 36.

Namely, reaction force (holding force) can be effectively applied to the center airbag 36 that has been inflated and deployed, even in a case in which the vehicle seat 12 adopts the front side position, and the occupant is effectively restrained by the center airbag 36. Therefore, the center airbag 36 according to the first exemplary embodiment enables an occupant to be effectively restrained, regardless of the position of the vehicle seat 12 (restraint performance with respect to the occupant can be ensured).

In addition, the tension transmission base cloth 40 is formed in a substantially rhombic shape in side view, and the upper peripheral edge portion 40A and the lower peripheral edge portion 40B at the rear side of the tension transmission base cloth 40 are sewn and attached along the constricted portion 36A of the center airbag 36. This enables the center airbag 36 to be pulled in a state in which the shape of the center airbag 36 is stabilized at a time at which the center airbag 36 that has been inflated and deployed is pulled toward the front side, compared to a case in which the tension transmission base cloth 40 is not provided and the one end portion 42A of the strap 42 is directly attached to the constricted portion 36A.

Particularly, in a side view, it is more effective when the upper end of the tension transmission base cloth 40 is disposed at approximately the same height position as the tether 38 of the center airbag 36 that has been inflated and deployed, and the lower end of the tension transmission base cloth 40 is disposed at approximately the same height position as the attachment position (the lower end peripheral edge portion 35A of the tube portion 35 of the inner cloth 34) of the center airbag 36 at the seatback 16.

Namely, the portion at which the tether 38 is provided and the attachment position of the center airbag 36 are portions with high rigidity. Therefore, when the tension transmission base cloth 40 is provided between the two, the center airbag 36 that has been inflated and deployed can be pulled toward the front side with good up-down balance (in a state in which the shape is more stabilized), via the tension transmission base cloth 40, due to the strap 42 that is retracted by the retracting device 50. In other words, a tension line to be applied to the center airbag 36 can be efficiently ensured, and reaction force can be more effectively (vertically balanced) applied to the center airbag 36.

Further, the retracting device 50 that retracts the strap 42 is provided at the front portion of the vehicle seat 12 at the lower face side of the seat cushion 14. This enables the retracting device 50 to efficiently pull the strap 42 toward the front side. Therefore, reaction force can be more effectively applied to the center airbag 36 that has been inflated and deployed, thereby enabling restraining force with respect to the occupant to be improved.

Further, when the retracting device 50 is provided at the front portion of the vehicle seat 12 at the lower face side of the seat cushion 14, it is not necessary to arrange the strap 42, which is pulled toward the front side, from the front side to the rear side of the seat cushion 14 or provide a pulley or the like at the front side of the seat cushion 14, compared to cases in which the retracting device 50 is provided at the rear side of the vehicle seat 12, at the lower face side of the seat cushion 14. This enables the length of the strap 42 to be reduced, and enables a pulley or the like to not be provided, thereby enabling the configuration of the lower face side of the seat cushion 14 to be simplified.

Further, the retracting device 50 includes the spool 44 on which the other end portion side of the strap 42 is wound, the rack and pinion mechanism 46 that rotates the spool 44, and the gas generator 48 that drives the rack and pinion mechanism 46. This enables the strap 42 to be effectively retracted at an appropriate timing that is different from the timing of inflation and deployment of the center airbag 36.

In other words, the strap 42 can be pulled toward the front side at a timing at which an occupant that is moving toward the vehicle width direction inner side under inertia force can be effectively restrained by the center airbag 36 that has been inflated and deployed. This enables reaction force to be more effectively applied to the center airbag 36 that has been inflated and deployed, and enables the occupant to be effectively restrained by the center airbag 36.

Further, a configuration is such that the intermediate portion of the strap 42 is housed in the case 26 that is provided at the outer wall face 24A of the upper rail 24 of the vehicle seat 12, and protrudes out from the case 26 when retracted by the retracting device 50. Namely, in a normal state, the intermediate portion of the strap 42 is hidden by the case 26. Therefore, the appearance of the vehicle seat 12 can be inhibited from being spoiled by the intermediate portion of the strap 42 in a normal state.

Second Exemplary Embodiment

Next, a second exemplary embodiment will be explained. It should be noted that portions that are the same as those in the above-described first exemplary embodiment are appended with the same reference numerals, and detailed explanation (including common operation) is appropriately omitted.

Figure 6A:
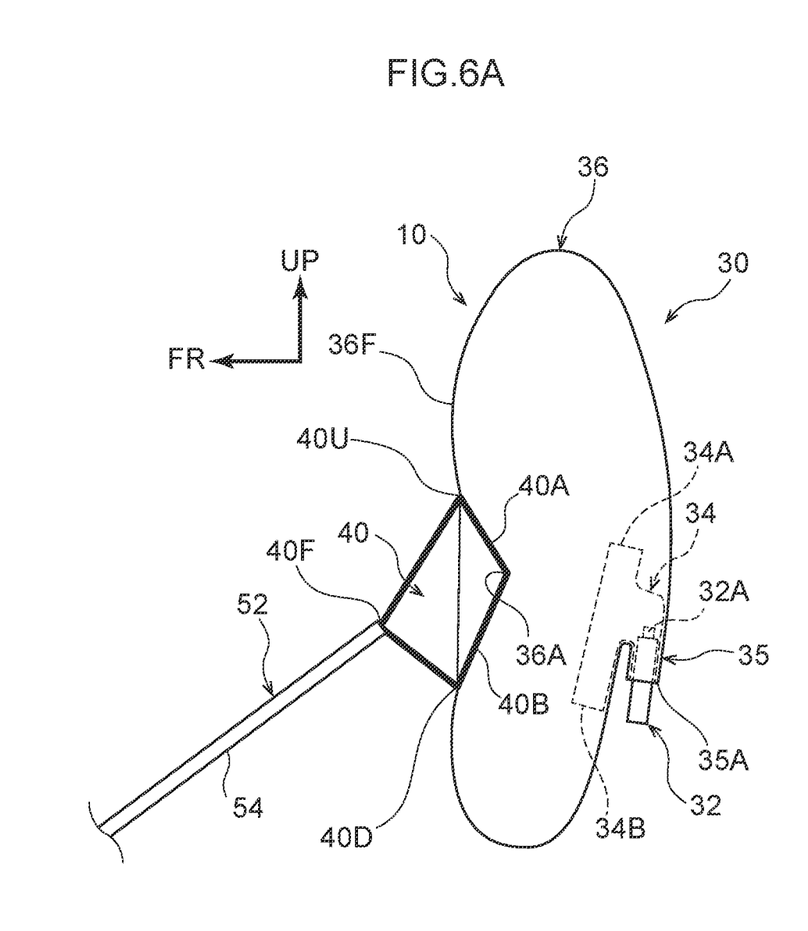
FIG. 6A is a schematic side view illustrating a state prior to actuation of a retracting device of a vehicle occupant restraint device according to a second exemplary embodiment.
Figure 6B:
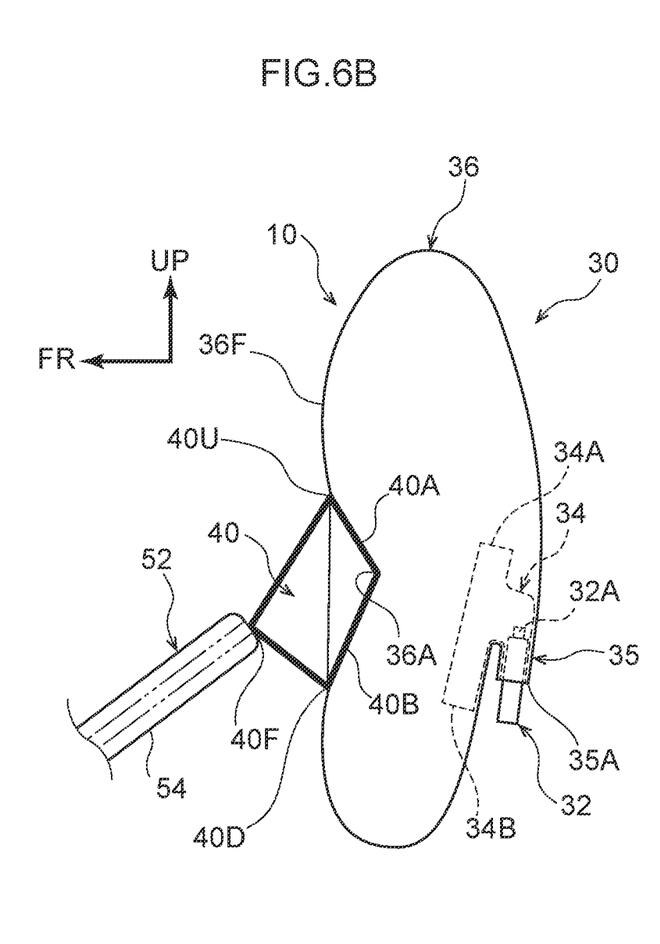
FIG. 6B is a schematic side view illustrating a state after actuation of the retracting device of the vehicle occupant restraint device according to the second exemplary embodiment.

As illustrated in FIG. 6A and FIG. 6B, in the second exemplary embodiment, only the configuration of the string-like member and the retracting device 50 is different from those in the first exemplary embodiment. Namely, the string-like member in the second exemplary embodiment is an inflatable tension strap 52 that generates tension due to inflation of a chamber 54, and the retracting device 50 includes an inflator 56 (illustrated in virtual lines in FIG. 3) that supplies gas to the chamber 54.

The inflator 56 is provided at the front portion of the vehicle seat 12 at the lower face side of the seat cushion 14 with the seat width direction as an axial direction (see FIG. 3), for example, and one seat width direction end portion including an ejection port of the inflator 56 is communicatively connected to the chamber 54 that is housed in the inflatable tension strap 52.

The chamber 54 that is housed in the inflatable tension strap 52 is configured to inflate in a direction orthogonal to an extending direction of the inflatable tension strap 52, and is configured such that a predetermined tension is applied in the extending direction of the inflatable tension strap 52 due to inflation thereof.

Therefore, due to the inflator 56 being actuated and gas being supplied to the chamber 54, the inflatable tension strap 52 is pulled toward the front side (specifically, the front lower side). As a result, the center airbag 36 that has been inflated and deployed is effectively pulled toward the front side at an appropriate timing to restrain the occupant via the tension transmission base cloth 40.

It should be noted that since the inflatable tension strap 52 is inflated in a direction orthogonal to the extending direction thereof, for example, the thighs or the like of the occupant can be restrained by the inflated inflatable tension strap 52. Namely, the inflatable tension strap 52 enables restraint performance with respect to an occupant to be improved.

Although the vehicle occupant restraint device 10 according to the present exemplary embodiments has been explained above based on the drawings, the vehicle occupant restraint device 10 according to the present exemplary embodiments is not limited to that which is illustrated in the drawings, and appropriate design modifications can be implemented within a range that does not depart from the gist of the present disclosure.

For example, an upper extension portion (not illustrated in the drawings) that reaches the lower end portion of the left side portion 16S of the seatback 16 may be integrally provided at a rear end portion of the case 26, the strap 42 may be housed, and the strap 42 that is pulled out from the lower end portion of the left side portion 16S of the seatback 16 may be configured so as not to be seen at all, at least in side view.

Further, in the present exemplary embodiment, although explanation has been made taking a small occupant as an example, even in a case of an occupant of a standard body size or a large occupant, operation effects that facilitate obtaining reaction force from a console box are only added, and the same operation effects as described above are obtained. Further, the retracting device 50 is not limited to the respective configurations illustrated in the drawings, and any configuration may be such that the other end portion side of the strap 42 is pulled toward the front side at an appropriate timing.

What is claimed is:

1. A vehicle occupant restraint device, comprising:
   a vehicle seat that is provided at a vehicle interior so as to be movable in a vehicle front-rear direction by an upper rail that is supported by a lower rail;
   a center airbag that is provided at a side portion at a vehicle width direction inner side of a seatback of the vehicle seat, and that inflates and deploys toward a vehicle width direction inner side of an occupant seated at the vehicle seat due to gas ejected from an inflator being supplied to an interior of the center airbag;

a strap member, one end portion of the strap member being attached to a seat front side end portion of the center airbag and another end portion of the strap member being attached to a retracting device, and the strap member being pulled toward a seat front side due to the strap member being retracted by the retracting device at a timing at which the occupant is restrained by the center airbag that has been inflated and deployed;

a tether that is provided further toward a seat upper side than a seat up-down direction central portion at the interior of the center airbag, and that maintains a shape of the center airbag that has been inflated and deployed; and a tension transmission base cloth that is provided at a seat up-down direction central portion at the seat front side end portion of the center airbag, and to which the one end portion of the strap member is attached, wherein, in side view, an upper end of the tension transmission base cloth is disposed at a same height position as the tether of the center airbag that has been inflated and deployed, and a lower end of the tension transmission base cloth is disposed at a same height position as an attachment position of the center airbag at the seatback.

2. The vehicle occupant restraint device according to claim 1, wherein:

the retracting device is provided at a seat front side portion of a seat cushion of the vehicle seat; and an intermediate portion of the strap member is housed in a case that is provided at a seat width direction outer side of the upper rail of the vehicle seat, and the intermediate portion protrudes out from the case at a time at which the intermediate portion is retracted by the retracting device.

3. The vehicle occupant restraint device according to claim 2, wherein the retracting device comprises:

a spool around which another end portion of the strap member is wound; and a rack and pinion mechanism that is driven by a gas generator and that causes the spool to rotate.

4. The vehicle occupant restraint device according to claim 2, wherein:

the strap member is an inflatable tension strap that generates tension due to inflation of a chamber; and the retracting device comprises an inflator that supplies gas to the chamber.

5. A vehicle occupant restraint device, comprising:

a vehicle seat that is provided at a vehicle interior so as to be movable in a vehicle front-rear direction by an upper rail that is supported by a lower rail;

a center airbag that is provided at a side portion at a vehicle width direction inner side of a seatback of the vehicle seat, and that inflates and deploys toward a vehicle width direction inner side of an occupant seated at the vehicle seat due to gas ejected from an inflator being supplied to an interior of the center airbag; and a strap member, one end portion of the strap member being attached to a seat front side end portion of the center airbag and another end portion of the strap member being attached to a retracting device, and the strap member being pulled toward a seat front side due to the strap member being retracted by the retracting device at a timing at which the occupant is restrained by the center airbag that has been inflated and deployed, wherein the retracting device is provided at a seat front side portion of a seat cushion of the vehicle seat, and wherein an intermediate portion of the strap member is housed in a case that is provided at a seat width direction outer side of the upper rail of the vehicle seat, and the intermediate portion protrudes out from the case at a time at which the intermediate portion is retracted by the retracting device.

6. The vehicle occupant restraint device according to claim 5, wherein the retracting device comprises:

a spool around which another end portion of the strap member is wound; and a rack and pinion mechanism that is driven by a gas generator and that causes the spool to rotate.

7. The vehicle occupant restraint device according to claim 5, wherein:

the strap member is an inflatable tension strap that generates tension due to inflation of a chamber; and the retracting device comprises an inflator that supplies gas to the chamber.

* * * * *